US012720310B2

(12) United States Patent
Mohammed

(10) Patent No.: US 12,720,310 B2
(45) Date of Patent: Aug. 25, 2026

(54) ACCESS POINT SUPPORTING CERTIFICATE-BASED AND PRE-SHARED-KEY-BASED AUTHENTICATION

(71) Applicant: Ruckus IP Holdings LLC, Claremont, NC (US)

(72) Inventor: Christopher Mohammed, Whitby (CA)

(73) Assignee: Ruckus IP Holdings LLC, Horsham, PA (US)

( * ) Notice: Subject to any disclaimer, the term of this patent is extended or adjusted under 35 U.S.C. 154(b) by 527 days.

(21) Appl. No.: 18/128,319

(22) Filed: Mar. 30, 2023

(65) Prior Publication Data

US 2023/0319564 A1 Oct. 5, 2023

Related U.S. Application Data

(60) Provisional application No. 63/325,682, filed on Mar. 31, 2022.

(51) Int. Cl.
*H04W 12/069* (2021.01)
*H04W 84/12* (2009.01)

(52) U.S. Cl.
CPC .......... *H04W 12/069* (2021.01); *H04W 84/12* (2013.01)

(58) Field of Classification Search
CPC ... H04W 12/069; H04W 84/12; H04W 12/00; H04W 12/06; H04W 12/062; H04W 12/065; H04W 12/068; H04W 76/00; H04W 76/10; H04W 80/00; H04W 84/00; H04W 84/02; H04W 84/10; H04W 88/00; H04W 88/08; H04W 88/12; H04W 92/00; H04W 92/10; H04W 92/12
See application file for complete search history.

(56) References Cited

U.S. PATENT DOCUMENTS 10,750,366 B1 * 8/2020 Gundavelli ......... H04W 12/069
10,820,201 B1 * 10/2020 Thangaveluchamy ...................... H04W 12/06
11,405,789 B1 * 8/2022 Wei ......................... H04W 4/50
(Continued)

*Primary Examiner* — Yuwen Pan
*Assistant Examiner* — Samuel H. Leonard
(74) *Attorney, Agent, or Firm* — Myers Bigel, P.A.

(57) ABSTRACT

During operation, a computer network device may provide an identifier for a network (such as an SSID for a WLAN) that supports certificate-based authentication and pre-shared-key-based authentication. Then, during an authentication procedure, the computer network device may receive an authentication request associated with an electronic device, where the authentication request specifies an instance of the certificate-based authentication or an instance of the pre-shared-key-based authentication. Moreover, the computer network device may provide authentication information addressed to a computer based at least in part on the authentication request. Next, the computer network device may receive, associated with the computer, an access response based at least in part on the authentication information, where the access response allows the electronic device to access the network when the authentication is successful, and the access response includes different attributes for the instance of the certificate-based authentication and the instance of the pre-shared-key-based authentication.

19 Claims, 6 Drawing Sheets

(56) References Cited

U.S. PATENT DOCUMENTS

2006/0041750 A1* 2/2006 Carter ................. H04W 12/037
713/168
2007/0171910 A1* 7/2007 Kumar ................ H04W 12/069
370/395.21
2011/0088078 A1* 4/2011 Kholaif ................. H04W 48/16
726/3
2013/0305332 A1* 11/2013 Narasimhan ...... H04W 36/0038
726/7
2017/0223536 A1* 8/2017 Gupta ..................... G06F 21/31
2017/0272317 A1* 9/2017 Singla ................. H04L 41/0803
2019/0182736 A1* 6/2019 Jung ..................... H04W 84/12
2021/0377029 A1* 12/2021 Sloane .................. H04L 9/3242
2022/0232466 A1* 7/2022 Chen ................... H04L 61/5092
2023/0136319 A1* 5/2023 Logan ................... H04W 48/16
455/411
2023/0232233 A1* 7/2023 Varampetran ......... H04W 12/06
726/1
2023/0247422 A1* 8/2023 Lin ....................... H04W 12/06
726/6
2023/0247436 A1* 8/2023 Boettger ............... H04W 12/06
713/155
2023/0308305 A1* 9/2023 Lee ..................... H04L 12/2809

* cited by examiner

ACCESS POINT SUPPORTING CERTIFICATE-BASED AND PRE-SHARED-KEY-BASED AUTHENTICATION

CROSS REFERENCE TO RELATED APPLICATIONS

This application claims priority under 35 U.S.C. 119(e) to U.S. Provisional Application Ser. No. 63/325,682, "Access Point Supporting Certificate-Based and Pre-Shared-Key-Based Authentication," filed on Mar. 31, 2022, by Christopher Mohammed, the contents of which are herein incorporated by reference.

FIELD

The described embodiments relate to techniques for authenticating an electronic device to a network using certificate-based authentication or pre-shared-key-based authentication.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

One challenge associated with Wi-Fi is how to allow to securely authenticate electronic devices before they are allowed to establish connections to a network, such as a WLAN. In certificate-based authentication techniques (such as Wi-Fi Protected Access II or WPA2-Enterprise), an electronic device may need to be preconfigured with an authentication certificate in order to successfully authenticate with a network. Alternatively, other authentication techniques (such as WPA2-Personal) are based on pre-shared keys that are provided to an electronic device. In these other authentication techniques, information associated with a cryptographical calculation that is based on cryptographic information (such as a passphrase, which is sometime referred to as a dynamic pre-shared key or DPSK) is reproduced by the network, thereby authenticating the electronic device.

However, in many existing networks, in order to support certificate-based authentication and pre-shared-key-based authentication, a customer may need to create two WLANs having different service set identifiers (SSIDs). Thus, there may be a first WLAN having a first SSID that supports certificate-based authentication, and a second WLAN having a second SSID that supports pre-shared-key-based authentication. This increases the complexity of these networks, which is frustrating to customers.

SUMMARY

In a first group of embodiments, a computer network device the supports certificate-based authentication and pre-shared-key-based authentication is described. This computer network device may include: an interface circuit that communicates with a computer and an electronic device; a processor; and a memory that stores program instructions, where, when executed by the processor, the program instructions cause the computer network device to perform operations. Notably, during operation, the computer network device may provide an identifier for a network that supports the certificate-based authentication and the pre-shared-key-based authentication, where the pre-shared-key-based authentication includes dynamic pre-shared key (DPSK) authentication. Then, during an authentication procedure, the computer network device may receive an authentication request associated with the electronic device, where the authentication request specifies an instance of the certificate-based authentication or an instance of the pre-shared-key-based authentication. Moreover, the computer network device may provide authentication information addressed to the computer based at least in part on the authentication request. Next, the computer network device may receive, associated with the computer, an access response based at least in part on the authentication information, where the access response allows the electronic device to access the network when the authentication is successful, and the access response includes different attributes for the instance of the certificate-based authentication and the instance of the pre-shared-key-based authentication.

Note that the identifier may include a single SSID and the network may include a WLAN.

Moreover, the certificate-based authentication may include IEEE 802.1x.

Furthermore, the pre-shared-key-based authentication may include external DPSK (EDPSK) authentication.

Additionally, the identifier may be provided in a beacon and/or in a probe response addressed to the electronic device (which may be provided in response to a probe request associated with the electronic device).

In some embodiments, the computer may be a controller of the computer network device in the network. This controller may be local or remote from the computer network device (such as an on-premises controller or a cloud-based controller).

Moreover, when the authentication request specifies an instance of a second pre-shared-key-based authentication that is different from the pre-shared-key-based authentication, the computer network device may perform second authentication of the electronic device. When the second authentication is successful, the computer network device may allow the electronic device to access the network.

Furthermore, when the authentication request specifies the instance of the pre-shared-key-based authentication, the authentication request may include passphrase parameters corresponding to a passphrase (such as a DPSK) associated with a user, and the passphrase parameters may include inputs to a cryptographic calculation and an output of the cryptographic calculation. The authentication information may include the passphrase parameters. However, note that the authentication request may not include the passphrase.

In some embodiments, the passphrase parameters may include: a random number associated with the electronic device, a random number associated with the computer network device, the output of the cryptographic calculation, a second identifier of the electronic device (such as a media access control or MAC address), and/or a third identifier of the computer network device (such as a MAC address of the computer network device).

Additionally, the access response may be intended for the electronic device and may include information for establishing the secure access of the electronic device to the network.

Note that the computer network device may include an access point.

Furthermore, the authentication request may include a remote authentication dial-in user service (RADIUS) access request and the access response may include a RADIUS access acceptance message.

Another embodiment provides the electronic device that performs counterparts to some of the operations performed by the computer network device.

Another embodiment provides the computer that performs counterparts to some of the operations performed by the computer network device.

Another embodiment provides an authentication, authorization, and accounting (AAA) server that communicates with the computer and that performs the authentication based at least in part on the authentication information. For example, in response to receiving the passphrase parameters from the computer, the AAA server may calculate one or more second outputs of the cryptographic calculation based at least in part on the inputs and one or more stored passphrases. Moreover, when there is a match between one of the one or more second outputs and the output, the AAA server may optionally access a policy associated with the user. Then, when one or more criteria associated with the policy are met, the AAA server may selectively provide the access response to the access point via the computer.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

A second group of embodiments describes a computer network device that supports certificate-based authentication and pre-shared-key-based authentication is described. This computer network device may include: an interface circuit that communicates with a computer and an electronic device; a processor; and a memory that stores program instructions, where, when executed by the processor, the program instructions cause the computer network device to perform operations. Notably, during operation, the computer network device may provide a first identifier for a first network (such as a first WLAN) that supports the certificate-based authentication and a second identifier for a second network (such as a second WLAN) that supports the pre-shared-key-based authentication, where the pre-shared-key-based authentication includes DPSK authentication. Then, during an authentication procedure, the computer network device may receive an authentication request associated with the electronic device, where, when the authentication request is received via the first network, the authentication request specifies an instance of the certificate-based authentication and the first identifier or, when the authentication request is received via the second network, an instance of the pre-shared-key-based authentication and the second identifier. Moreover, the computer network device may provide authentication information addressed to the computer based at least in part on the authentication request. Next, the computer network device may receive, associated with the computer an access response based at least in part on the authentication information, where the access response allows the electronic device to access the first network or the second network when the authentication is successful, and the access response includes different attributes for the instance of the certificate-based authentication and the instance of the pre-shared-key-based authentication.

Another embodiment provides the electronic device that performs counterparts to some of the operations performed by the computer network device.

Another embodiment provides the computer that performs counterparts to some of the operations performed by the computer network device.

Another embodiment provides an authentication, authorization, and accounting (AAA) server that communicates with the computer and that performs the authentication based at least in part on the authentication information.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
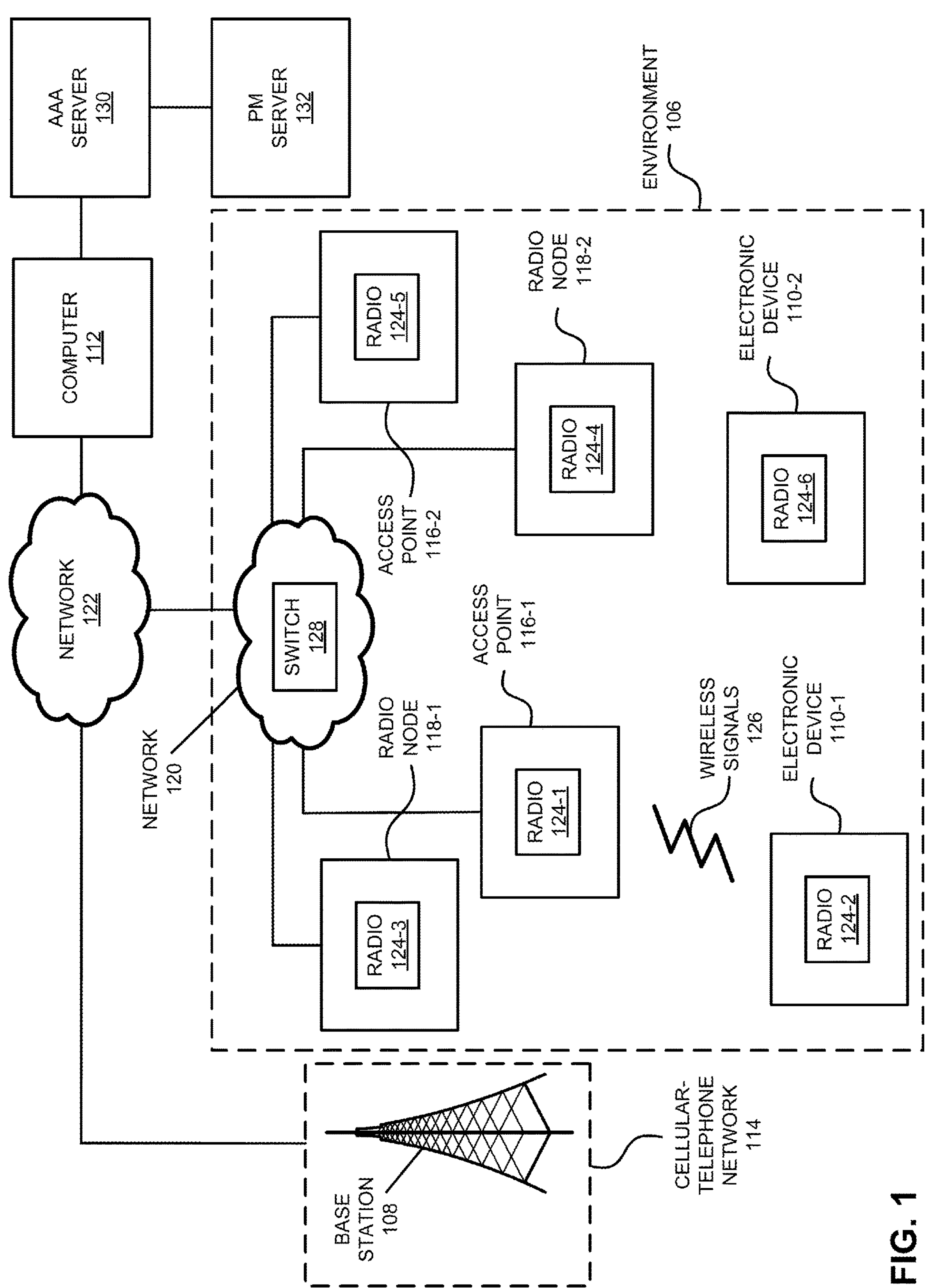
FIG. 1 is a block diagram illustrating an example of communication among electronic devices in accordance with an embodiment of the present disclosure.

A computer network device the supports certificate-based authentication and pre-shared-key-based authentication is described. During operation, the computer network device may provide an identifier for a network (such as an SSID for a WLAN) that supports the certificate-based authentication and the pre-shared-key-based authentication, where the pre-shared-key-based authentication includes DPSK authentication. Then, during an authentication procedure, the computer network device may receive an authentication request associated with an electronic device, where the authentication request specifies an instance of the certificate-based authentication or an instance of the pre-shared-key-based authentication. Moreover, the computer network device may provide authentication information addressed to a computer (such as a controller that communicates with a AAA server) based at least in part on the authentication request. Next, the computer network device may receive, associated with the computer, an access response based at least in part on the authentication information, where the access response allows the electronic device to access the network when the authentication is successful, and the access response includes different attributes for the instance of the certificate-based authentication from those for the instance of the pre-shared-key-based authentication.

By supporting the certificate-based authentication and the pre-shared-key-based authentication, these communication techniques may enable conditional access to the network. Notably, the communication techniques may allow a single WLAN to support the certificate-based authentication and the pre-shared-key-based authentication via communication with the computer, such as the controller, which in turn may communicate with a AAA server. Consequently, the communication techniques may reduce complexity and overhead associated with authentication, which may improve the user experience when communicating in the network and/or in managing the network.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or computer 112 (which may be a local or a cloud-based controller that manages and/or configures access points 116, radio nodes 118 and/or switch 128, or that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 6:
FIG. 6 is a block diagram illustrating an example of an electronic device in accordance with an embodiment of the present disclosure.
Figure 6:
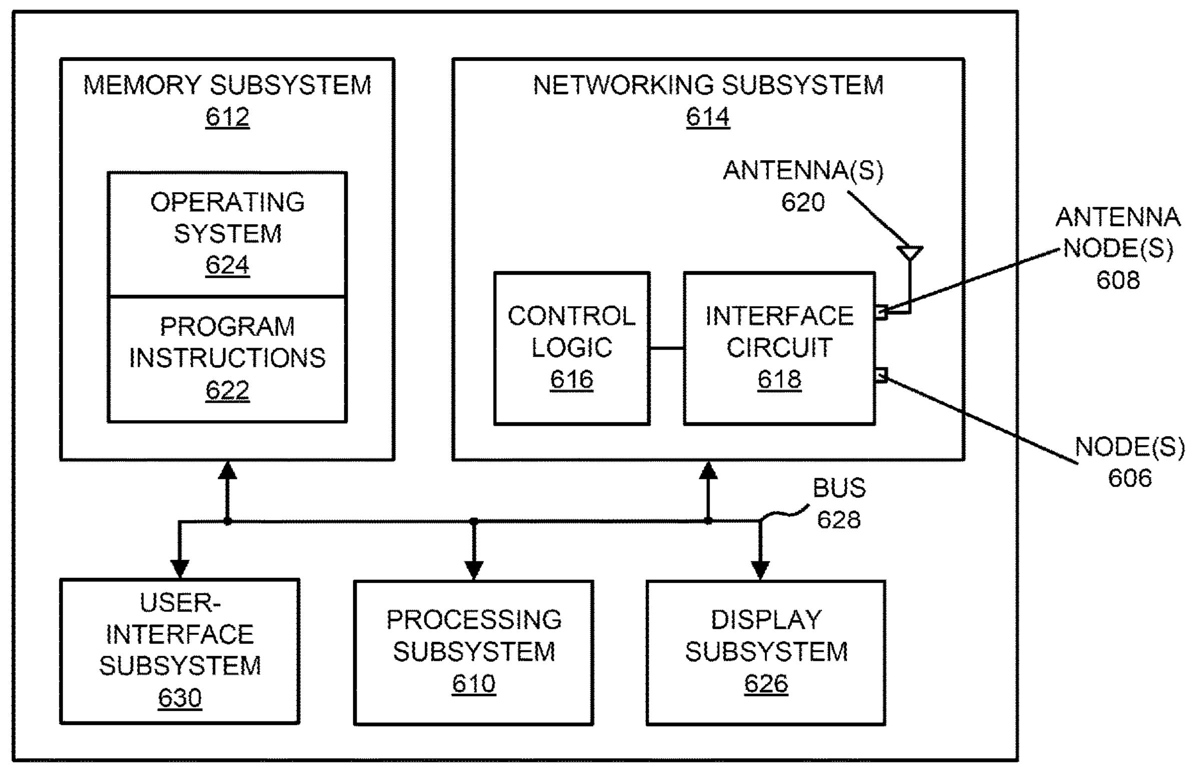

As described further below with reference to FIG. 6, electronic devices 110, computer 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, in many existing networks, separate WLANs with different SSIDs are needed in order to support certificate-based authentication and pre-shared-key-based authentication. As described further below with reference to FIGS. 2-5, in order to address these problems, a computer network device (such as access point 116-1, radio node 118-1 or switch 128) may, in conjunction with computer 112 and AAA server 130, support multiple different authentication techniques using a single WLAN having an associated SSID. This WLAN may provide secure communication to an electronic device (such as electronic device 110-1) following successful authentication using, e.g., the certificate-based authentication or the pre-shared-key-based authentication. Consequently, in some embodiments, the computer network device may be preconfigured with or may have an authentication certificate and/or a passphrase. In the discussion that follows, access point 116-1 is used to illustrate the communication techniques.

Notably, during operation, access point 116-1 may provide an identifier for a network that supports the certificate-based authentication (such as IEEE 802.1x) and the pre-shared-key-based authentication (such as EDPSK authentication). For example, access point 116-1 may broadcast a beacon with the SSID of the WLAN. Electronic device 110-1 may discover access point 116-1 by receiving the beacon, and then may associate with access point 116-1 (and, thus, with a network, such as the WLAN and/or network 120, provided by access point 116-1). Alternatively, electronic device 110-1 may provide a probe request to access point 116-1 and, in response, access point 116-1 may provide a probe response with the SSID of the WLAN. Note that the information included in the beacon or the probe response may indicate or specify (directly or indirectly) that the WLAN supports the certificate-based authentication and the pre-shared-key-based authentication.

Moreover, electronic device 110-1 may provide an authentication request to access point 116-1, where the authentication request specifies an instance of the certificate-based authentication or an instance of the pre-shared-key-based authentication. Then, access point 116-1 may optionally provide a user-equipment context request to computer 112. As described further below, computer 112 may optionally subsequently provide a user-equipment context response to access point 116-1, which may confirm that there is not an existing context or association for electronic device 110-1 in the WLAN.

Furthermore, access point 116-1 may provide an authentication response to electronic device 110-1. Next, electronic device 110-1 may provide an association request to access point 116-1, which may respond by providing an association response to electronic device 110-1. Note that, at this point there is a connection between electronic device 110-1 and access point 116-1, but the communication is not encrypted. In some embodiments, computer 112 may provide the user-equipment context response to access point 116-1, such as a negative acknowledgment or NACK.

Additionally, after associating with electronic device 110-1 and when the authentication request specifies the instance of the pre-shared-key-based authentication, access point 116-1 may provide a first message in a four-way handshake with electronic device 110-1. This first message may include a random number associated with access point 116-1 (which is sometimes referred to as an 'ANonce'). In response, electronic device 110-1 may construct, derive or generate a pairwise transient key (PTK). For example, the PTK may be constructed or generated using a cryptographic calculation (such as a pseudo-random function) and a pre-shared key (such as a passphrase, e.g., a DPSK or another type of digital certificate) the ANonce, a second random number associated with electronic device 110-1 (which is sometimes referred to as an 'SNonce'), an identifier of access point 116-1 (such as a MAC address of access point 116-1), and/or an identifier of electronic device 110-1 (such as a MAC address of electronic device 110-1). The passphrase may be preinstalled or preconfigured on electronic device 110-1 and may be stored in memory that is accessible by AAA server 130. In some embodiments, a user of electronic device 110-1 may receive the passphrase and install it on electronic device 110-1 using a portal (such as website or web page), an email, an SMS message, etc.

Note that the passphrase may be independent of an identifier associated with electronic device 110-1, such as the MAC address of electronic device 110-1. More generally, the passphrase may be independent of electronic device 110-1 or hardware in electronic device 110-1. The passphrase may be associated with a location, such as a room, a building, a communication port (such as a particular Ethernet port), etc. (In general, in the present discussion a 'location' may not be restricted to a physical location, but may be abstracted to include an object or entity associated with a physical location, such as a particular room or building.) Alternatively or additionally, the passphrase may be associated with one or more users, such as a guest or family in a hotel. Thus, in some embodiments, the passphrase includes a common passphrase that is shared by a group of electronic devices (e.g., the common passphrase may be a group DPSK).

Furthermore, electronic device 110-1 may provide a second message in the four-way handshake to access point 116-1. The second message may include the SNonce and a message integrity check (MIC) to access point 116-1. In some embodiments, the second message includes: the inputs to the cryptographic calculation and an output of the cryptographic calculation.

While the preceding discussion illustrated the first two messages in the four-way handshake in the context of the instance of the pre-shared-key-based authentication, in other embodiments, after associating with electronic device 110-1 and when the authentication request specifies the instance of the certificate-based authentication, access point 116-1 may exchange similar first and second messages with electronic device 110-1. In these embodiments, note that electronic device 110-1 may be preconfigured with the authentication certificate or another type of digital certificate.

Then, access point 116-1 may provide an access request to computer 112 with authentication information (such as a RADIUS access request), and computer 112 may provide the access request to AAA server 130 (such as a RADIUS access request). In embodiments where the authentication information specifies the instance of the pre-shared-key-based authentication, the authentication information may include passphrase parameters associated with the user. (Therefore, in some embodiments, the passphrase parameters may be included in a RADIUS attribute, such as a VSA, e.g., Ruckus VSA 153.) The passphrase parameters may include: the inputs to the cryptographic calculation and an output of the cryptographic calculation. For example, the passphrase parameters may include: the ANonce, the SNonce, the MIC, the MAC address of electronic device 110-1, and/or the MAC address of access point 116-1. In addition, the access request may include other information, such as: a cluster name, a zone name, the SSID of the WLAN, a basic service set identifier (BSSID) of access point 116-1, and a username of the user. However, note that the authentication request and the access request may not include the passphrase (such as the DPSK of the user).

Based at least in part on the passphrase parameters, AAA server 130 may perform authentication and authorization, including comparing cryptographic information specified by the passphrase with stored information (such as the DPSK or the other type of digital certificate) for electronic device 110-1. More generally, AAA server 130 may use information specified by the passphrase to determine whether electronic device 110-1 is authorized to access network 120 and/or network 122. In some embodiments, AAA server 130 implements or uses a RADIUS protocol. Alternatively, in some embodiments, HTTP or HTTP-based protocol (such as HTTPv2, websockets or gRPC) may be used.

Notably, AAA server 130 may perform brute-force calculations of outputs of the cryptographic calculation based at least in part on the inputs to the cryptographic calculation and different stored passphrases. When there is a match between one of these calculated outputs and the output received from electronic device 110-1, it may confirm that AAA server 130 is able to construct, derive or generate the same PTK as electronic device 110-1, so that electronic device 110-1 and access point 116-1 will be able to encrypt and decrypt their communication with each other.

Then, AAA server 130 may optionally access a policy associated with the user (e.g., by performing a look up based at least in part on a username of the user) that governs the access to the WLAN (and, more generally, to network 120 and/or network 122). For example, the policy may include the policy may include a time interval when the passphrase is valid. Moreover, the policy may include a location where the passphrase is valid (such as a location of access point 116-1) or the network that the user is allowed to access. In some embodiments, AAA server 130 may optionally communicate with property management (PM) server 132, which is associated with an organization, to determine whether electronic device 110-1 is associated with the location (such as whether a user of electronic device 110-1 is checked into or associated with a room where access point 116-1 is located). Note that the location may include: a room, a building, a communication port, a facility associated with the organization (such as a hotel or an education institution), etc. More generally, AAA server 130 may optionally communicate with PM server 132 to determine whether one or more criteria associated with the policy are met.

Next, when one or more criteria associated with the policy are met (and, more generally, when the authentication is successful), AAA server 130 may selectively provide an access response or an access acceptance message to computer 112 (such as a RADIUS access acceptance message). This access response may be intended for electronic device 110-1 and may include information for establishing secure access of electronic device 110-1. For example, the access response may include: an identifier of electronic device 110-1, a tunnel type, a tunnel medium type, a tunnel privilege group identifier, a filter identifier, and the username.

In response, computer 112 may provide the access response (such as a RADIUS access acceptance message) to access point 116-1. Next, access point 116-1 may provide a third message in the four-way handshake to electronic device 110-1. Furthermore, electronic device 110-1 may provide a fourth message in the four-way handshake to access point 116-1, such as an acknowledgment. At this point, access point 116-1 may establish secure access to the WLAN for electronic device 110-1 (and, more generally, secure access to network 120 and/or network 122, such as an intranet or the Internet). Notably, the secure access may be in a personal area network (PAN) in the WLAN, which is independent of traffic associated with other PANs in the WLAN.

In some embodiments, the secure access may be implemented using a virtual network associated with the location (such as a virtual network for the PAN), and the information in the access response may allow electronic device 110-1 to establish secure communication with the virtual network. This secure communication may be independent of traffic associated with other users of the WLAN. For example, access point 116-1 may bridge traffic between electronic device 110-1 and another member of a group of electronic devices (such as electronic device 110-2) in the virtual network in the WLAN, where the traffic in the virtual network is independent of other traffic associated with one or more different virtual networks in the network. Note that the virtual network may include a VLAN. Alternatively, when the aforementioned operations of access point 116-1 are performed by switch 128, the virtual network may include a VXLAN. In these embodiments, switch 128 may bridge wired traffic (such as Ethernet frames) associated with electronic device 110-1 in virtual network.

Moreover, the virtual network may be specified by an identifier that is included in the access response. For example, the identifier may include a VLANID (for use with access point 116-1) or a VNI (for use with switch 128). Moreover, the identifier may include information that is capable of specifying more than 4,096 virtual networks. In some embodiments, the identifier may include 24 bits, which can be used to specify up to 16 million virtual networks.

In some embodiments, the virtual network is implemented in a virtual dataplane in access point 116-1 (such as using a generic routing encapsulation or GRE tunnel). Note that a dataplane is generally responsible for moving data around transmit paths, while a control plane is generally responsible for determining and setting up those transmit paths. The dataplane may be implemented using virtual machines that are executed by multiple cores in one or more processors (which is sometimes referred to as a 'virtual dataplane'), which allows the dataplane to be flexibly scaled and dynamically reconfigured. In the present discussion, a virtual machine is an operating system or application environment that is implemented using software that imitates or emulates dedicated hardware or particular functionality of the dedicated hardware.

Additionally, in some embodiments, the policy allows the user to access multiple networks at different locations (such as different geographic locations, e.g., different hotels in a hotel brand or chain). In these embodiments, the inputs used to calculate the one or more second outputs of the cryptographic calculation may include a given identifier of a given network (such as a given SSID). Moreover, the one or more stored passphrases may be organized based at least in part on identifiers of different networks. In these embodiments, related stored passphrases may be grouped based at least in part on a given network that a user is asking to join, which may reduce the computational time need by AAA server 130 to calculate the outputs for the different stored passphrases.

While the preceding discussion illustrate communication and operations associated with the instance of the pre-shared-key-based authentication, in other embodiments, where the authentication request specifies the instance of the certificate-based authentication, access point 116-1, computer 112 and AAA server 130 may perform authentication operations, such as comparing username, password and/or information corresponding to an authentication certificate with stored information to determine if there is a match. Notably, after exchanging the first and the second message in the four-way handshake, access point 116-1 may provide an access request with authentication information (such as a username, a password, and/or information associated with or corresponding to the authentication certificate and, more generally, the certificate-based authentication) to computer 112, which then provides this authentication information to AAA server 130. AAA server 130 may authenticate the user based at least in part on the authentication information (such as by performing a look up of stored information corresponding to the authentication certificate and/or optionally accessing a policy associated with the user, e.g., by communicating with PM server 132). When the authentication is successful (such as when one or more criteria associated with the policy are met), AAA server 130 may selectively provide an access response or an access acceptance message to computer 112 (such as a RADIUS access acceptance message). This access response may be intended for electronic device 110-1 and may include information for establishing secure access of electronic device 110-1. In response, computer 112 may provide the access response (such as a RADIUS access acceptance message) to access point 116-1. Next, access point 116-1 may provide a third message in the four-way handshake to electronic device 110-1. Furthermore, electronic device 110-1 may provide a fourth message in the four-way handshake to access point 116-1, such as an acknowledgment. At this point, access point 116-1 may establish secure access to the WLAN for electronic device 110-1 (and, more generally, secure access to network 120 and/or network 122, such as an intranet or the Internet). Note that the access response or the access response may include different attributes or information for the instance of the certificate-based authentication from those for the instance of the pre-shared-key-based authentication.

Moreover, while the preceding discussion illustrated completion of the instance of the pre-shared-key-based authentication or the certificate-based authentication by remotely located (such as cloud-based) AAA server 130, in other embodiments access point 116-1 may perform authentication of the user. For example, when the authentication request specifies an instance of a second pre-shared-key-based authentication that is different from the pre-shared-key-based authentication, access point 116-1 may perform second authentication of electronic device 110-1. In some embodiments, access point 116-1 may perform similar authentication operations to those performed by AAA server 130 during the pre-shared-key-based authentication. When the second authentication is successful, access point 116-1 may allow electronic device 110-1 to access the network.

Furthermore, while the preceding embodiments illustrated the communication techniques with access point 116-1 that hosts or provides a WLAN that supports multiple different authentication technique, in other embodiments access point 116-1 may host or provide different WLANs (with different SSIDs) for different authentication techniques, and electronic device 110-1 may authenticate using a particular authentication technique via the correspond WLAN that supports this authentication technique. For example, access point 116-1 may provide a first identifier for a first network (such as a first WLAN) that supports the certificate-based authentication and a second identifier for a second network (such as a second WLAN) that supports the pre-shared-key-based authentication. Then, during an authentication procedure, access point 116-1 may receive an authentication request from electronic device 110-1, where, when the authentication request is received via the first network, the authentication request specifies an instance of the certificate-based authentication and the first identifier or, when the authentication request is received via the second network, an instance of the pre-shared-key-based authentication and the second identifier. Moreover, access point 116-1 may provide authentication information addressed to computer 112 based at least in part on the authentication request. Next, access point 116-1 may receive, associated with computer 112 an access response based at least in part on the authentication information, where the access response allows electronic device 110-1 to access the first network or the second network when the authentication is successful, and the access response includes different attributes for the instance of the certificate-based authentication from those for the instance of the pre-shared-key-based authentication.

Additionally, in some embodiments, at least some of the authentication operations performed by access point 116-1 are performed by computer 112, separately from access point 116-1 or in conjunction with access point 116-1.

In this way, the communication techniques may allow access point 116-1, computer 112 and/or AAA server 130 to selectively approve access by electronic device 110-1 to a network. Notably, the communication techniques may allow secure access by electronic device 110-1 using one of multiple authentication techniques supported by the WLAN. For example, the pre-shared-key-based authentication may be based at least in part on the passphrase and the policy. This may allow dynamic secure access to the network, such as access at one or more locations and/or at different times. These capabilities may allow access point 116-1 to provide secure communication to one or more of electronic devices 110 without a complicated and time-consuming onboarding process, multiple WLANs and/or difficult passphrase management. Consequently, the communication techniques may improve the user experience when using electronic device 110-1, access point 116-1 and communicating via the network, and/or in managing access point 116-1 and the network.

While the preceding discussion illustrated the communication techniques with communication between access point 116-1 (and, more generally, a computer network device) and AAA server 130 mediated by computer 112, in other embodiments computer 112 may be excluded. Consequently, in some embodiments, access point 116-1 may communicate with AAA server 112 without computer 112. Moreover, while the preceding discussion illustrated the communication techniques with AAA server 112 communicating with PM server 132, in other embodiments information stored in PM server 132 is included in AAA server 130, so that PM server 132 may be excluded.

Figure 2:
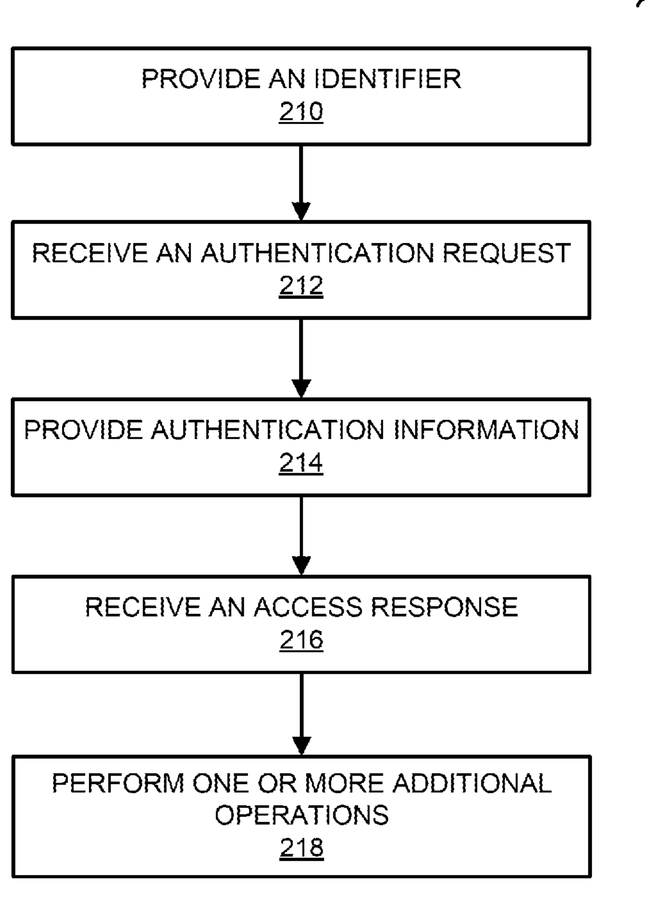
FIG. 2 is a flow diagram illustrating an example of a method for supporting certificate-based authentication and pre-shared-key-based authentication using a computer network device in FIG. 1 in accordance with an embodiment of the present disclosure.

We now describe embodiments of the method. FIG. 2 presents a flow diagram illustrating an example of a method 200 for supporting certificate-based authentication and pre-shared-key-based authentication, which may be performed by a computer network device, such as one of access points 116, one of radio nodes 118 or switch 128 in FIG. 1. During operation, the computer network device may provide an identifier for a network (operation 210) that supports the certificate-based authentication and the pre-shared-key-based authentication. Note that the identifier may include a single SSID and the network may include a WLAN. Moreover, the certificate-based authentication may include IEEE 802.1x and/or the pre-shared-key-based authentication may include EDPSK authentication. In some embodiments, the identifier may be provided in a beacon and/or in a probe response addressed to the electronic device (which may be provided in response to a probe request associated with the electronic device).

Then, during an authentication procedure, the computer network device may receive an authentication request (operation 212) associated with the electronic device, where the authentication request specifies an instance of the certificate-based authentication or an instance of the pre-shared-key-based authentication.

Moreover, the computer network device may provide authentication information (operation 214) addressed to the computer based at least in part on the authentication request. Note that the computer may be a controller of the computer network device in the network. This controller may be local or remote from the computer network device (such as an on-premises controller or a cloud-based controller).

Next, the computer network device may receive, associated with the computer, an access response (operation 216) based at least in part on the authentication information, where the access response allows the electronic device to access the network when the authentication is successful, and the access response includes different attributes for the instance of the certificate-based authentication from those for the instance of the pre-shared-key-based authentication. Note that the access response may be intended for the electronic device and may include information for establishing the secure access of the electronic device to the network.

In some embodiments, the computer network device may optionally perform one or more additional operations (operation 218). For example, when the authentication request specifies an instance of a second pre-shared-key-based authentication that is different from the pre-shared-key-based authentication, the computer network device may perform second authentication of the electronic device. When the second authentication is successful, the computer network device may allow the electronic device to access the network.

Moreover, the computer network device may provide a second message to the electronic device with the information. Furthermore, the computer network device may bridge traffic associated with the electronic device in a virtual network in a network, where the traffic in the virtual network is independent of other traffic associated with one or more different virtual networks in the network.

Additionally, when the authentication request specifies the instance of the pre-shared-key-based authentication, the authentication request may include passphrase parameters corresponding to a passphrase (such as a DPSK) associated with a user, and the passphrase parameters may include inputs to a cryptographic calculation and an output of the cryptographic calculation. The authentication information may include the passphrase parameters. However, note that the authentication request may not include the passphrase.

In some embodiments, the passphrase parameters may include: a random number associated with the electronic device, a random number associated with the computer network device, the output of the cryptographic calculation, a second identifier of the electronic device (such as a MAC address), and/or a third identifier of the computer network device (such as a MAC address of the computer network device).

Moreover, the authentication request may include a RADIUS access request and the access response may include a RADIUS access acceptance message.

Figure 3:
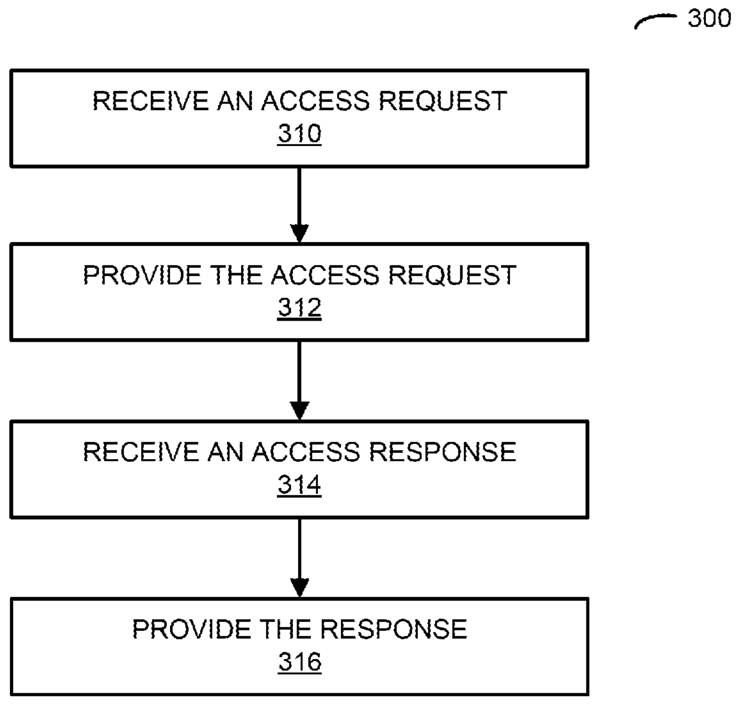
FIG. 3 is a flow diagram illustrating an example of a method for supporting certificate-based authentication and pre-shared-key-based authentication using a computer in FIG. 1 in accordance with an embodiment of the present disclosure.

FIG. 3 presents a flow diagram illustrating an example of a method 300 for supporting certificate-based authentication and pre-shared-key-based authentication, which may be performed by a computer, such as computer 112 in FIG. 1. During operation, the computer may receive an access request (operation 310) from a computer network device (such as an access point, a radio node or a switch). This access request may include passphrase parameters, such as: inputs to a cryptographic calculation and an output of the cryptographic calculation. For example, the passphrase parameters may include: a random number associated with an electronic device, a random number associated with the computer network device, the output of the cryptographic calculation, an identifier of the electronic device, and/or the identifier of the computer network device. In some embodiments, the access request includes a RADIUS access request. Alternatively, the access request may include authentication information associated with certificate-based authentication (such as an authentication certificate of the electronic device).

Then, the computer may provide the access request (operation 312) to a second computer (such as a AAA server). Moreover, the computer may receive an access response (operation 314) from the second computer. This access response may information for establishing secure access of the electronic device to a network. Note that, in some embodiments, the response includes a RADIUS access acceptance message. Next, the computer may provide the access response (operation 316) to the computer network device. Note that the access response may include different attributes (or information) for an instance of the certificate-based authentication from those for an instance of the pre-shared-key-based authentication.

Figure 4:
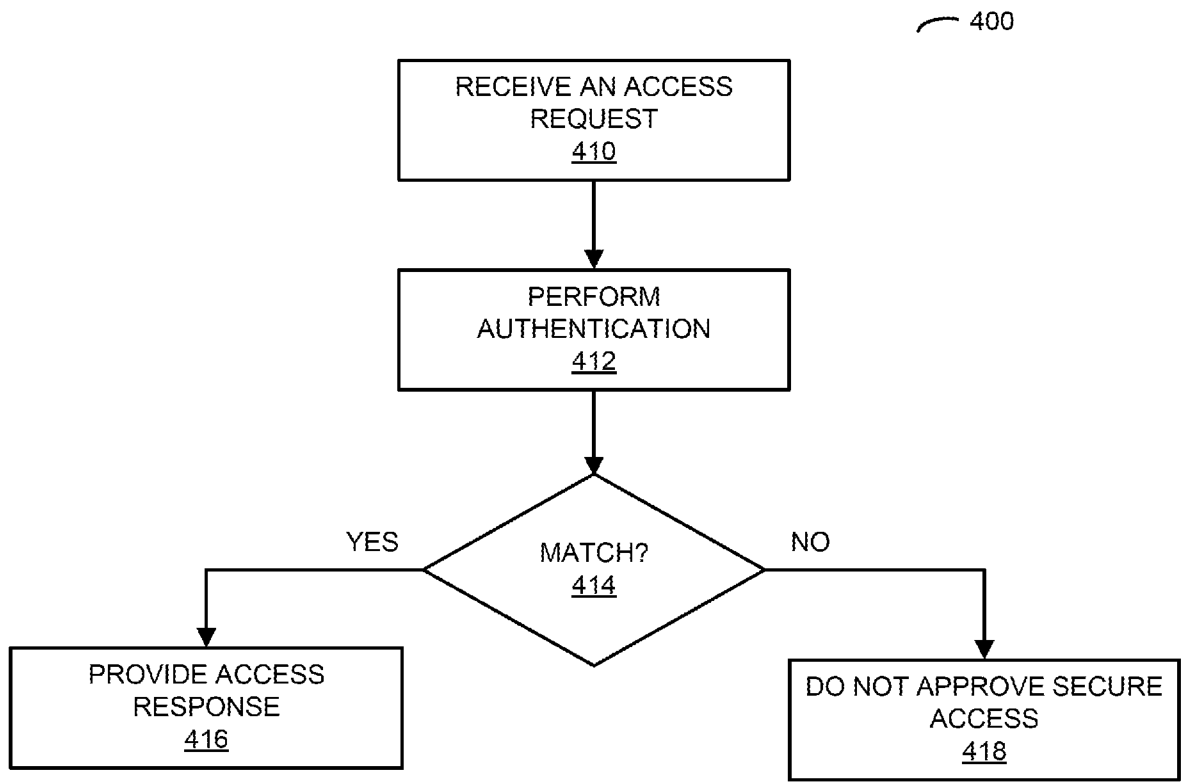
FIG. 4 is a flow diagram illustrating an example of a method for selectively approving secure access using a computer in FIG. 1 in accordance with an embodiment of the present disclosure.

FIG. 4 presents a flow diagram illustrating an example of a method 400 for selectively approving secure access, which may be performed by a computer, such as AAA server 130 in FIG. 1. During operation, the computer may receive an access request (operation 410) associated with a second computer, where the access request includes authentication information. For example, for the instance of the certificate-based authentication, the access request may include a username, password and/or information associated with the authentication certification. Alternatively, for the instance of the pre-shared-key-based authentication, the access request may include passphrase parameters corresponding to a passphrase associated with a user, and the passphrase parameters include inputs to a cryptographic calculation and an output of the cryptographic calculation. Moreover, the passphrase parameters may include: a random number associated with a second electronic device, a random number associated with a computer network device, an output of a cryptographic calculation, an identifier of the second electronic device (such as a MAC address), and/or an identifier of the computer network device (such as a MAC address).

In response, the computer may authenticate the user (operation 412). Notably, for the instance of the certificate-based authentication, the computer may compare the authentication information with stored information. Then, when there is a match (operation 414) or one or more criteria are met, the computer may selectively provide an access response (operation 416) to the second computer, where the access response is intended for the second electronic device and includes information for establishing the secure access of the second electronic device to a network. For example, the second electronic device may, at least in part, use the information to encrypt/de-encrypt communication and/or to establish a tunnel. Otherwise, the computer may not approve the secure access (operation 418).

For example, for the pre-shared-key-based authentication, the computer may calculate one or more second outputs of the cryptographic calculation based at least in part on the inputs and one or more stored passphrases. Note that the passphrase and the stored passphrases may include a DPSK of the user. In some embodiments, the second electronic device is included in a group of electronic devices that are associated with the user and that share the passphrase. Thus, the passphrase and the stored passphrases may include a group DPSK that is used by the group of electronic devices. However, the passphrase itself may not be included in the access request.

Moreover, when there is a match between one of the one or more second outputs and the output, the computer may optionally access a policy associated with the user. Otherwise, the computer may not approve the secure access. Furthermore, when one or more criteria associated with the policy are met, the computer may selectively provide the access response (operation 416). Otherwise, the computer may not approve the secure access.

In some embodiments, the policy may include a time interval when the passphrase is valid. In some embodiments, the policy may include a location where the passphrase is valid (such as a location of the computer network device) or the network that the user is allowed to access. For example, the computer may communicate with a second computer (such as a PM server associated with an organization) to determine whether the second electronic device is associated with the location. When the second electronic device is associated with the location, the computer may selectively provide the access response (operation 416). Note that the location may include: a room, a building, a communication port, a facility associated with the organization (such as a hotel or an education institution), etc. Alternatively or additionally, the passphrase may identify the user known to be assigned to a location (e.g. a hotel room) and, based at least in part on the know the location, the second computer may know the identifier of the network on which to place the electronic device.

Moreover, the network may include a virtual network associated with the location (such as a virtual network for a PAN), and the information in the access response may allow the second electronic device to establish secure communication with the virtual network. This secure communication may be independent of traffic associated with other users of the network. For example, the computer network device may bridge traffic between the second electronic device and a group of electronic devices in the virtual network in the network, where the traffic in the virtual network is independent of other traffic associated with one or more different virtual networks in the network. Note that the virtual network may include: a VLAN or a VXLAN.

Furthermore, the virtual network may be specified by an identifier that is included in the access response. For example, the identifier may include a VLANID or a VNI. Alternatively or additionally, the virtual network may include: QinQ, mobility tunnels (e.g., using Home Hub and group identifiers) and/or a MAC address mapping procedure. Moreover, the identifier may include information that is capable of specifying more than 4,096 virtual networks.

Additionally, the access request may include a RADIUS access request and the access response may include a RADIUS access acceptance message. Note that the passphrase parameters may be included in a RADIUS attribute, such as a VSA. Alternatively, in some embodiments, a hypertext transfer protocol (HTTP) or HTTP-based protocol (such as HTTPv2, websockets or gRPC) may be used.

In some embodiments, the policy may allow the user to access multiple networks at different locations. In these embodiments, the inputs used to calculate the one or more second outputs of the cryptographic calculation may include a given identifier of a given network. Moreover, the one or more stored passphrases may be organized based at least in part on identifiers of different networks.

Furthermore, the second electronic device may be pre-configured with the passphrase and/or the authentication certificate. Note that the passphrase may be independent of the identifier associated with the second electronic device, such as the MAC address of the second electronic device. More generally, the passphrase may be independent of the second electronic device or hardware in the second electronic device.

In some embodiments of method 200 (FIG. 2), 300 (FIG. 3) and/or 400, there may be additional or fewer operations. Furthermore, the order of the operations may be changed, and/or two or more operations may be combined into a single operation.

Figure 5:
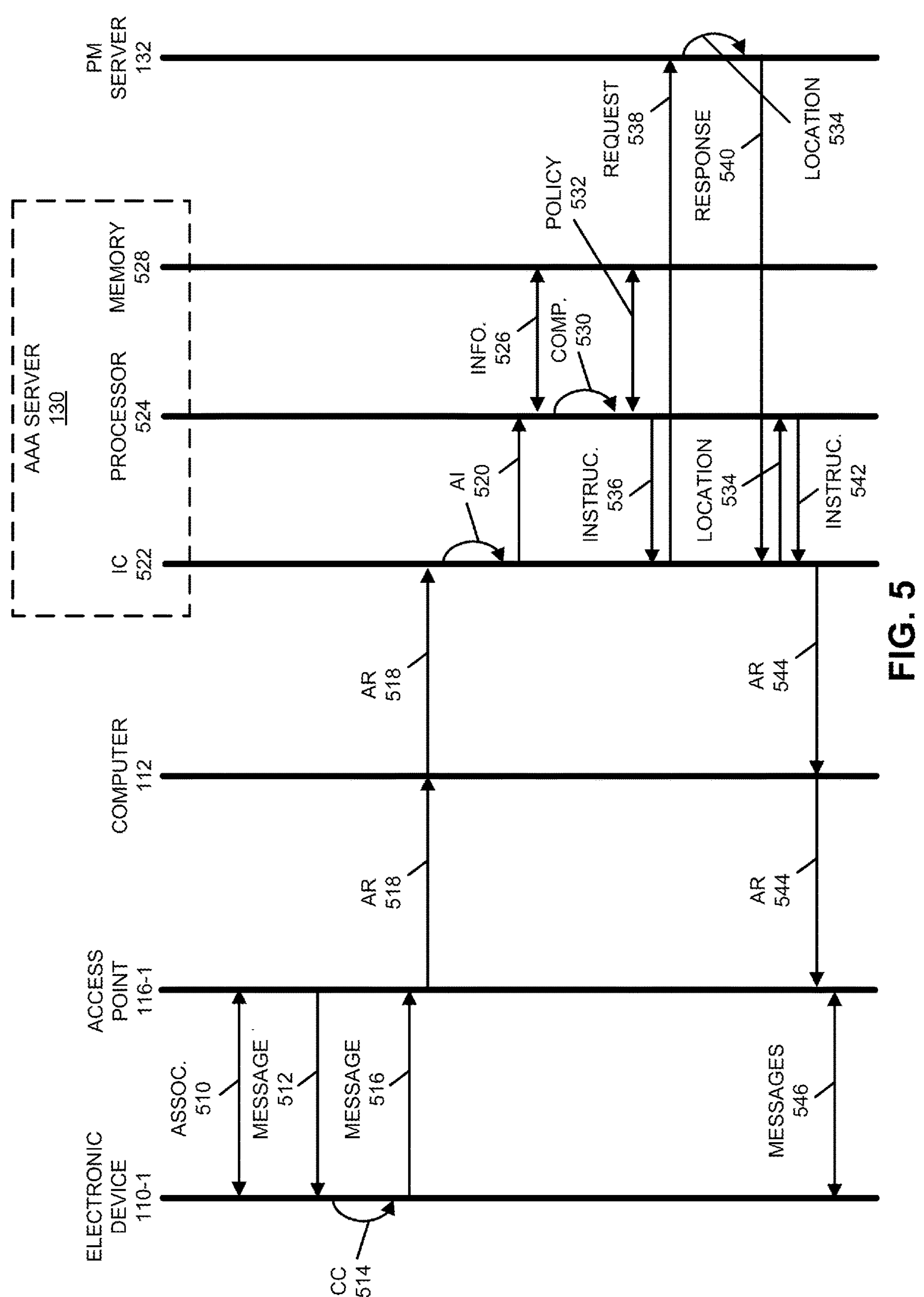
FIG. 5 is a drawing illustrating an example of communication among a computer network device and computers in FIG. 1 in accordance with an embodiment of the present disclosure.

Embodiments of the communication techniques are further illustrated in FIG. 5, which presents a drawing illustrating an example of communication among electronic device 110-1, access point 116-1, computer 112, AAA server 130 and PM sever 132. In FIG. 5, an interface circuit in electronic device 110-1 may discover and associate 510 with access point 116-1 via an interface circuit in access point 116-1. For example, electronic device 110-1 may receive a beacon (not shown) from access point 116-1 with an SSID of a WLAN that supports certificate-based authentication and pre-shared-key-based authentication.

Then, the interface circuit in access point 116-1 may provide a message 512 with a random number that is associated with access point 116-1 (such as an ANonce). After receiving message 512, electronic device 110-1 (such as a processor in electronic device 110-1) may perform a cryptographic calculation (CC) 514 using a passphrase (such as a DPSK or another type of digital certificate, such as an authentication certificate), the random number from access point 116-1, a random number associated with electronic device 110-1 (such as an SNonce), an identifier of access point 116-1 (such as a MAC address), and/or an identifier of electronic device 110-1 (such as a MAC address). Moreover, the interface circuit in electronic device 110-1 may provide a message 516 with inputs to the cryptographic calculation 514 and an output of the cryptographic calculation 514. For example, message 516 may include the random number associated with electronic device 110-1 and a MIC. Alternatively or additionally, message 516 may include: a username, a password and/or information associated with an authentication certificate of electronic device 110-1.

After receiving message 516, the interface circuit in access point 116-1 may provide an access request (AR) 518 to computer 112. This access request may include authentication information (AI) 520. For example, for an instance of certificate-based authentication, authentication information 520 may include: the username, the password and/or the information associated with the authentication certificate. Alternatively, for an instance of pre-shared-key-based authentication, authentication information 520 may include passphrase parameters corresponding to the passphrase associated with a user of electronic device 110-1. In some embodiments, the passphrase parameters may include: inputs to the cryptographic calculation 514 and an output of the cryptographic calculation 514. Moreover, after receiving access request 518, an interface circuit in computer 112 may provide access request 518 to AAA server 112.

Furthermore, after receiving access request 518, an interface circuit 522 in AAA server 130 may provide authentication information 520 to a processor 524 in AAA server 130. Processor 524 may perform comparison(s) 530 of authentication information 520 with stored information 526 in memory 528 in AAA server 130. For example, for the instance of the certificate-based authentication, processor 524 may compare the username, the password and/or the information associated with the authentication certificate to stored information 520. Alternatively, for the instance of the pre-shared-key-based authentication, processor 524 may calculate outputs of the cryptographic calculation 514 using the passphrase parameters and stored passphrases in memory 528 in AAA server 130.

When there is a match for comparison(s) 530 (such as between one of the calculated outputs and the output received from electronic device 110-1), processor 524 may access a policy 532 in memory 528. For example, policy 532 may indicate that secure access to a network is allowed when the user is at a location 534. In these embodiments, processor may instruct 536 interface circuit 522 to confirm that electronic device 110-1 is at location 534 by providing a request 538 to PM server 132. After an interface circuit in PM server 132 receives request 538, a processor in PM server 132 may determine that electronic device 110-1 is at location 534. For example, access point 116-1 or a communication port may be associated with location 534, and/or the user may be associated with location 534 (such as a hotel room or a dorm room at a college or a university), and the processor in PM server 132 may determine that electronic device 110-1 is at location 534 by performing a lookup in memory in PM server 132. Next, the interface circuit in PM sever 132 may provide a response 540 with the confirmation.

After interface circuit 522 receives response 540 and provides information about location 534 to processor 524, processor 524 may instruct 542 interface circuit 522 to provide an access response (AR) 544 to electronic device 110-1 with information for establishing secure access of electronic device 110-1 to a network. Then, after receiving access response 544, the interface circuit in computer 112 may provide access response 544 to access point 116-1. Moreover, after receiving access response 544, the interface circuit in access point 116-1 and the interface circuit in electronic device 110-1 may exchange additional messages 546 to complete the four-way handshake. Furthermore, based at least in part on the information in access response 544, access point 116-1 and electronic device 110-1 may establish secure access of electronic device 110-1 to the network.

While FIG. 5 illustrates communication between components using unidirectional or bidirectional communication with lines having single arrows or double arrows, in general the communication in a given operation in this figure may involve unidirectional or bidirectional communication. Moreover, while FIG. 5 illustrates operations being performed sequentially or at different times, in other embodiments at least some of these operations may, at least in part, be performed concurrently or in parallel.

Currently, if a customer wants to have a DPSK network and an IEEE 802.1x network, the customer may need to create two SSIDs supporting both of these frameworks. In an environment, where IEEE 802.1x is not available for some electronic devices, a customer may have to create one SSID to support a non-IEEE 802.1x network (e.g., for WPA, WPA2-Personal, WPA3, etc.) for those electronic devices, as well as a network to support IEEE 802.1x. Many customers would prefer is a single SSID that can support different frameworks. Using the disclosed communication techniques, this capability may be supported. Notably, a network administrator may create a WPA2-Personal, a WPA2-Enterprise WLAN and/or WPA3 on a single SSID. Moreover, the network administrator may use this capability of an access point to include DPSK authentication. Consequently, an access point may broadcast its capabilities of a single WLAN as WPA2-Personal, WPA2-Enterprise and/or WPA3. For example, a client using a WPA2-Enterprise framework may forward its credentials to the access point. Alternatively, a client using WPA2-Personal, but with DPSK, may connect using its DPSK. The Access Point may forward this access request to a cloud-based computer (such as a AAA server), which may determine if the user is accepted or rejected. If accepted, the user may be allowed on to the network using the WPA2-Personal framework or the WPA2-Enterprise framework. If the user is rejected the user may not be allowed on the network. Similar problems may occur with other WPA protocols (such as WPA3).

We now describe embodiments of an electronic device, which may perform at least some of the operations in the communication techniques. FIG. 6 presents a block diagram illustrating an example of an electronic device 600 in accordance with some embodiments, such as one of: base station 108, one of electronic devices 110, computer 112, one of access points 116, one of radio nodes 118, switch 128, AAA server 132 and/or PM server 132. This electronic device includes processing subsystem 610, memory subsystem 612, and networking subsystem 614. Processing subsystem 610 includes one or more devices configured to perform computational operations. For example, processing subsystem 610 can include one or more microprocessors, graphics processing units (GPUs), ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include DRAM, static random access memory (SRAM), and/or other types of memory. In some embodiments, instructions for processing subsystem 610 in memory subsystem 612 include: one or more program modules or sets of instructions (such as program instructions 622 or operating system 624, such as Linux, UNIX, Windows Server, or another customized and proprietary operating system), which may be executed by processing subsystem 610. Note that the one or more computer programs, program modules or instructions may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing sub system 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as antenna nodes 608, e.g., a metal pad or a connector, which can be coupled to the one or more antennas 620, or nodes 606, which can be coupled to a wired or optical connection or link. Thus, electronic device 600 may or may not include the one or more antennas 620. Note that the one or more nodes 606 and/or antenna nodes 608 may constitute input(s) to and/or output(s) from electronic device 600.) For example, networking subsystem 614 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 600 may be adapted or changed using pattern shapers (such as directors or reflectors) and/or one or more antennas 620 (or antenna elements), which can be independently and selectively electrically coupled to ground to steer the transmit antenna pattern in different directions. Thus, if one or more antennas 620 include N antenna pattern shapers, the one or more antennas may have 2N different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Moreover, electronic device 600 may include a user-interface subsystem 630, such as: a mouse, a keyboard, a trackpad, a stylus, a voice-recognition interface, and/or another human-machine interface. In some embodiments, user-interface subsystem 630 may include or may interact with a touch-sensitive display in display subsystem 626.

Electronic device 600 can be (or can be included in) any electronic device with at least one network interface. For example, electronic device 600 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments instructions 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614 and/or of electronic device 600. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer network device, comprising:

an interface circuit configured to communicate with an electronic device and a computer;

a processor coupled to the interface circuit; and memory, coupled to the processor, configured to store program instructions, wherein, when executed by the processor, the program instructions cause the computer network device to perform operations comprising:

provide an identifier for a network that supports certificate-based authentication and pre-shared-key-based authentication, wherein the pre-shared-key-based authentication comprises dynamic pre-shared key (DPSK) authentication, and the identifier comprises a single service set identifier (SSID) and the network comprises a wireless local area network (WLAN);

receive, during an authentication procedure, an authentication request associated with the electronic device, where the authentication request specifies an instance of the certificate-based authentication or an instance of the pre-shared-key-based authentication;

provide authentication information addressed to the computer based at least in part on the authentication request; and receive, associated with the computer, an access response based at least in part on the authentication information, wherein the access response allows the electronic device to access the network when the authentication procedure is successful, and wherein the access response comprises different attributes for the instance of the certificate-based authentication and the instance of the pre-shared-key-based authentication.

2. The computer network device of claim 1, wherein the certificate-based authentication comprises Institute of Electrical and Electronics Engineers (IEEE) 802.1x.

3. The computer network device of claim 1, wherein the pre-shared-key-based authentication comprises external DPSK (EDPSK) authentication.

4. The computer network device of claim 1, wherein the identifier is provided in a beacon and/or in a probe response addressed to the electronic device.

5. The computer network device of claim 1, wherein the computer comprises a controller of the computer network device in the network.

6. The computer network device of claim 1, wherein, when the authentication information specifies an instance of a second pre-shared-key-based authentication that is different from the pre-shared-key-based authentication, the operations comprise:

performing second authentication of the electronic device based at least in part on the authentication information; and when the second authentication is successful, allowing the electronic device to access the network.

7. The computer network device of claim 1, wherein, when the authentication request specifies the instance of the pre-shared-key-based authentication, the authentication request comprises passphrase parameters corresponding to a passphrase associated with a user, and the passphrase parameters comprise inputs to a cryptographic calculation and an output of the cryptographic calculation.

8. The computer network device of claim 7, wherein the authentication information comprises the passphrase parameters.

9. The computer network device of claim 7, wherein the passphrase parameters comprise one or more of: a random number associated with the electronic device, a random number associated with the computer network device, the output of the cryptographic calculation, a second identifier of the electronic device, a third identifier of the computer network device.

10. The computer network device of claim 1, wherein the access response is intended for the electronic device and comprises information for establishing the secure access of the electronic device to the network.

11. The computer network device of claim 1, wherein the computer network device comprises an access point.

12. The computer network device of claim 1, wherein the authentication request comprises a remote authentication dial-in user service (RADIUS) access request and the access response comprises a RADIUS access acceptance message.

13. A non-transitory computer-readable storage medium for use in conjunction with a computer network device, the computer-readable storage medium storing program instructions that, when executed by the computer network device, cause the computer network device to perform operations comprising:

providing an identifier for a network that supports certificate-based authentication and pre-shared-key-based authentication, wherein the pre-shared-key-based authentication comprises dynamic pre-shared key (DPSK) authentication, and the identifier comprises a single service set identifier (SSID) and the network comprises a wireless local area network (WLAN);

receiving, during an authentication procedure, an authentication request associated with an electronic device, where the authentication request specifies an instance of the certificate-based authentication or an instance of the pre-shared-key-based authentication;

providing authentication information addressed to a computer based at least in part on the authentication request; and receiving, associated with the computer, an access response based at least in part on the authentication information, wherein the access response allows the electronic device to access the network when the authentication procedure is successful, and wherein the access response comprises different attributes for the instance of the certificate-based authentication and the instance of the pre-shared-key-based authentication.

14. The non-transitory computer-readable storage medium of claim 13, wherein the certificate-based authentication comprises Institute of Electrical and Electronics Engineers (IEEE) 802.1x and the pre-shared-key-based authentication comprises external DPSK (EDPSK) authentication.

15. The non-transitory computer-readable storage medium of claim 13, wherein the identifier is provided in a beacon and/or in a probe response addressed to the electronic device.

16. A method for supporting certificate-based authentication and pre-shared-key-based authentication, comprising:

by a computer network device:

providing an identifier for a network that supports the certificate-based authentication and the pre-shared-key-based authentication, wherein the pre-shared-key-based authentication comprises dynamic pre-shared key (DPSK) authentication, and the identifier comprises a single service set identifier (SSID) and the network comprises a wireless local area network (WLAN);

receiving, during an authentication procedure, an authentication request associated with an electronic device, where the authentication request specifies an instance of the certificate-based authentication or an instance of the pre-shared-key-based authentication;

providing authentication information addressed to a computer based at least in part on the authentication request; and receiving, associated with the computer, an access response based at least in part on the authentication information, wherein the access response allows the electronic device to access the network when the authentication procedure is successful, and wherein the access response comprises different attributes for the instance of the certificate-based authentication and the instance of the pre-shared-key-based authentication.

17. The method of claim 16, wherein the identifier is provided in a beacon and/or in a probe response addressed to the electronic device.

18. The method of claim 16, wherein the computer comprises a controller of the computer network device in the network.

19. The method of claim 16, wherein, when the authentication information specifies an instance of a second pre-shared-key-based authentication that is different from the pre-shared-key-based authentication, the method comprises:

performing second authentication of the electronic device based at least in part on the authentication information; and when the second authentication is successful, allowing the electronic device to access the network.

* * * * *